United States Patent

Oishi

[11] Patent Number: 6,014,295
[45] Date of Patent: Jan. 11, 2000

[54] MAGNETIC DISC CARTRIDGE

[75] Inventor: Kengo Oishi, Kanagawa-ken, Japan

[73] Assignee: Fuji Photo Film Co., Ltd., Kanagawa-ken, Japan

[21] Appl. No.: 09/072,726

[22] Filed: May 6, 1998

[30] Foreign Application Priority Data

May 8, 1997 [JP] Japan ................................. 9-117889

[51] Int. Cl.[7] .................................................. G11B 23/03
[52] U.S. Cl. .......................................................... 360/133
[58] Field of Search .................................... 360/132–133

[56] References Cited

U.S. PATENT DOCUMENTS

| | | | |
|---|---|---|---|
| 4,445,157 | 4/1984 | Takahashi | 360/133 |
| 4,757,412 | 7/1988 | Iizuka et al. | 360/133 |
| 4,980,883 | 12/1990 | Mutou et al. | 360/144 X |
| 5,200,871 | 4/1993 | Hughes | 360/133 |
| 5,241,441 | 8/1993 | Yamada et al. | 360/133 |
| 5,315,470 | 5/1994 | Fujino et al. | 360/133 |
| 5,680,284 | 10/1997 | Oishi | 360/133 |

FOREIGN PATENT DOCUMENTS

| | | | |
|---|---|---|---|
| 0 352 918 | 1/1990 | European Pat. Off. | G11B 23/033 |
| 0 440 175 | 8/1991 | European Pat. Off. | G11B 23/03 |
| 0 498 609 | 8/1992 | European Pat. Off. | G11B 23/033 |
| 9-7333 | 1/1997 | Japan | G11B 23/033 |

*Primary Examiner*—Stuart S. Levy
*Assistant Examiner*—Angel Castro
*Attorney, Agent, or Firm*—Sughrue, Mion, Zinn, Macpeak & Seas, PLLC

[57] ABSTRACT

A magnetic disc cartridge includes a larger capacity magnetic disc with a center core fixed to its center. The magnetic disc is contained for rotation in a casing which is provided with a spindle hole through which a spindle of the disc drive system is inserted into the casing. The center core is provided with a collar portion on which the magnetic disc is fixed and an abutment surface which is parallel to the collar portion and is adapted to be held against a pedestal surface on the spindle of the disc drive system under magnetic attraction. A center hole is formed in the abutment surface substantially at the center thereof and a drive pin hole is formed in the abutment surface radially outwardly spaced from the center hole. An annular protrusion is formed on the inner surface of the casing so as to project toward the center core inside the collar portion to limit radial movement of the center core. A contact member is formed around the annular protrusion to project toward the center core so that the contact member is held away from the collar portion when the center core is rotated with the magnetic disc held horizontally and is brought into contact with the collar portion when the center core is rotated with the magnetic disc held inclined.

5 Claims, 2 Drawing Sheets

MAGNETIC DISC CARTRIDGE

BACKGROUND OF THE INVENTION

1. Field of the Invention

This invention relates to a magnetic disc cartridge which comprises a large capacity magnetic disc contained in a casing and is used in a magnetic recording and reproduction in which the magnetic disc is rotated at high speed, and more particularly to such a magnetic disc cartridge in which the magnetic disc can be surely chucked by a spindle for rotating the disc.

2. Description of the Related Art

There has been known a magnetic disc, a so-called floppy disc, which comprises magnetic layers formed on opposite sides of a flexible disc base of a polyester sheet or the like. Information is recorded on the floppy disc by a magnetic head while rotating the floppy disc. Such floppy discs have been mainly used as recording media for computers because they are easy to handle and available at low cost.

Recently the magnetic disc of this type is generally held for rotation in a small hard casing and used in the form of a magnetic disc cartridge as represented by a 3.5-inch floppy disc.

In the magnetic disc cartridge having a hard casing, the casing is provided with a magnetic head insertion opening through which a magnetic head is inserted into the casing and a shutter member for opening and closing the opening. The casing is further provided with a spindle hole in the bottom thereof and a spindle is inserted through the spindle hole to rotate the magnetic disc holding a center core fixed to the center of the magnetic disc. There has been constant demand for a magnetic disc cartridge having a larger storage capacity.

When a magnetic disc cartridge larger than conventional magnetic disc cartridges in storage capacity is developed, a novel disc drive system for driving the magnetic disc cartridge having a larger storage capacity is provided. Such a novel disc drive system is generally arranged to be able to drive magnetic disc cartridges having smaller storage capacities as well as the newly developed larger capacity magnetic disc cartridge. Such capability of driving magnetic disc cartridges having smaller storage capacities as well as the newly developed larger capacity magnetic disc cartridge will be referred to as "downward compatibilities", hereinbelow.

In order to obtain such downward compatibilities, the disc drive system should be arranged to be able to drive both the larger capacity magnetic disc cartridge and the smaller capacity magnetic disc cartridge by the same mechanism.

In the larger capacity magnetic disc cartridge, the magnetic disc is rotated at a higher speed than in the smaller capacity magnetic disc cartridge.

In the conventional (smaller capacity) magnetic disc cartridge, the center core of the magnetic disc is provided at the center thereof with a center hole into which a spindle of the disc drive system is inserted, and a drive pin hole with which a drive pin on the spindle of the disc drive system is engaged is formed in the center core radially spaced from the center hole. When the conventional magnetic disc cartridge is loaded in a disc drive system, the spindle of the disc drive system is inserted into the center hole of the center core with the center core urged toward the spindle under magnetic attraction. However the drive pin of the disc drive system cannot be generally brought into engagement with the drive pin hole by only loading the magnetic disc cartridge and is brought into engagement with the drive pin hole while the spindle rotates (the drive pin is rotated together with the spindle) relative to the magnetic disc. When the drive pin is brought into engagement with the drive pin hole, the magnetic disc is chucked and comes to be rotated in response to rotation of the spindle and the drive pin. That is, it is necessary for the spindle and the drive pin to rotate relative to the magnetic disc or the center core thereof in order to chuck the magnetic disc.

In the case of the conventional small capacity magnetic disc cartridge, there acts resistance to rotation of the magnetic disc due to its structure as will be described later and accordingly when the spindle begins to rotate, the spindle and the drive pin can rotate relative to the magnetic disc until the drive pin is brought into engagement with the drive pin hole. However in the case of the larger capacity magnetic disc cartridge, the resistance to rotation of the magnetic disc is made very small in order to rotate the magnetic disc at a high speed and accordingly, when the spindle begins to rotate, the magnetic disc can rotate together with the spindle, which prevents the drive pin from being brought into engagement with the drive pin hole and causes chucking failure.

Specifically, in the small capacity magnetic disc cartridge, a cleaning member (liner) is disposed between each side of the magnetic disc and the inner surface of the casing and is pressed against the magnetic disc by a lifter in order to clean the magnetic disc and to support the magnetic disc against the magnetic head to ensure a good head touch. The friction between the magnetic disc and the cleaning member resists rotation of the magnetic disc and the drive pin can rotate relative to the magnetic disc and be brought into engagement with the drive pin hole.

To the contrast, in the case of the larger capacity magnetic disc cartridge, the magnetic disc is rotated at a high speed since a high recording density and a high transfer rate are required. For example, the rotational speed of the magnetic disc is 300 to 360 rpm in the small capacity magnetic disc cartridge and 3000 to 3600 rpm in the larger capacity magnetic disc cartridge. When rotating at such a high speed, the driving resistance of the magnetic disc should be as small as possible, and accordingly the conventional cleaning system comprising a cleaning member and a lifter for pressing the cleaning member against the magnetic disc is not suitable for the larger capacity magnetic disc cartridge. As described above, the spindle, the drive pin and the center core should be the same as those in the conventional magnetic disc cartridge for the purpose of the downward compatibilities. However in the case of the larger capacity magnetic disc cartridge, there is a fear that the drive pin cannot be brought into engagement with the drive pin hole and chucking failure can take place due to small resistance. When the magnetic disc is rotated in the chucking failure state, reliability of recording and reproduction at a high recording density and a high track density cannot be ensured.

SUMMARY OF THE INVENTION

In view of the foregoing observations and description, the primary object of the present invention is to provide a larger capacity magnetic disc cartridge which can be surely chucked by the conventional drive mechanism without increasing the resistance to rotation of the magnetic disc so that the disc drive system for the larger capacity magnetic disc cartridge can have downward compatibilities.

In accordance with the present invention, there is provided a magnetic disc cartridge comprising a larger capacity magnetic disc which is provided with a center core fixed to its center and is contained for rotation in a casing which is provided with a magnetic head insertion opening through which a magnetic head of a disc drive system is inserted into the casing and a spindle hole through which a spindle of the disc drive system is inserted into the casing, wherein the improvement comprises that the center core is provided with a collar portion on which the magnetic disc is fixed and an abutment surface which is parallel to the collar portion and is adapted to be held against a pedestal surface on the spindle of the disc drive system under magnetic attraction, a center hole being formed in the abutment surface substantially at the center thereof and a drive pin hole being formed in the abutment surface radially outwardly spaced from the center hole, an annular protrusion is formed on the inner surface of the casing opposed to the spindle hole so as to project toward the center core inside the collar portion to limit radial movement of the center core, and a contact member is formed around the annular protrusion to project from the inner surface of the casing opposed to the spindle hole toward the center core in a position substantially opposed to the collar portion so that the contact member is held away from the collar portion when the center core is rotated with the magnetic disc held horizontally and is brought into contact with the collar portion to resist against rotation of the center core when the center core is rotated with the magnetic disc held inclined.

It is preferred that a wear resistant layer be provided on the contact surface of the contact member. Further preferably the contact member is formed of a spring leaf of metal, a wire spring of metal, resilient plastic resin or the like.

When the magnetic disc cartridge of this invention is loaded in a disc drive system for a larger capacity magnetic disc cartridge, the drive pin on the spindle of the drive system pushes the abutment surface of the center core to incline the center core to bring the collar portion into contact with the contact member on the inner surface of the casing whereas the tip of the spindle is received in the center hole. The contact between the collar portion and the contact member resists rotation of the center core and the drive pin can rotate relative to the center core into engagement with the drive pin hole. When the drive pin is received in the drive pin hole, the center core can be held horizontally with the abutment surface attracted against the pedestal surface of the spindle in perpendiuclar to the spindle. In this state, the contact member is held away from the collar portion of the center core and the resistance against rotation of the magnetic disc is lightened, whereby the magnetic disc can be stably rotated at a high speed. Thus in accordance with the present invention, a larger capacity magnetic disc cartridge which can be surely chucked by the conventional drive mechanism without increasing the resistance to rotation of the magnetic disc so that the disc drive system for the larger capacity magnetic disc cartridge can have downward compatibilities can be manufactured at low cost in a simple structure with a high reliability.

DESCRIPTION OF THE PREFERRED EMBODIMENT

Figure 1:
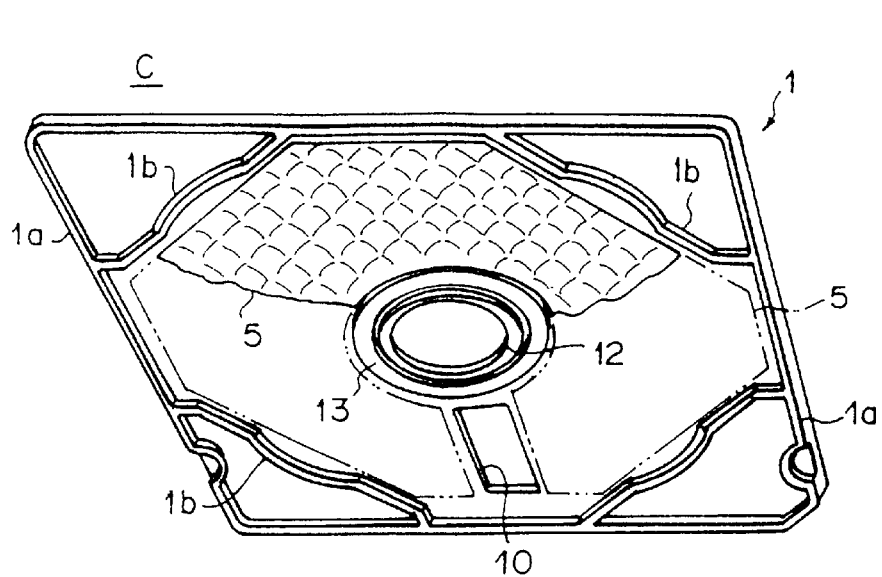
FIG. 1 is an exploded perspective view of a magnetic disc cartridge in accordance with an embodiment of the present invention.
Figure 1:
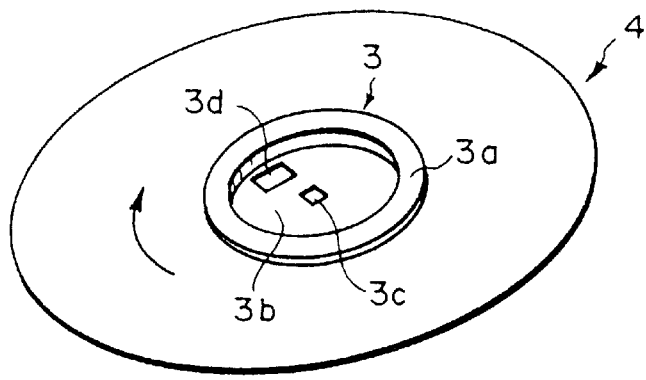
Figure 1:
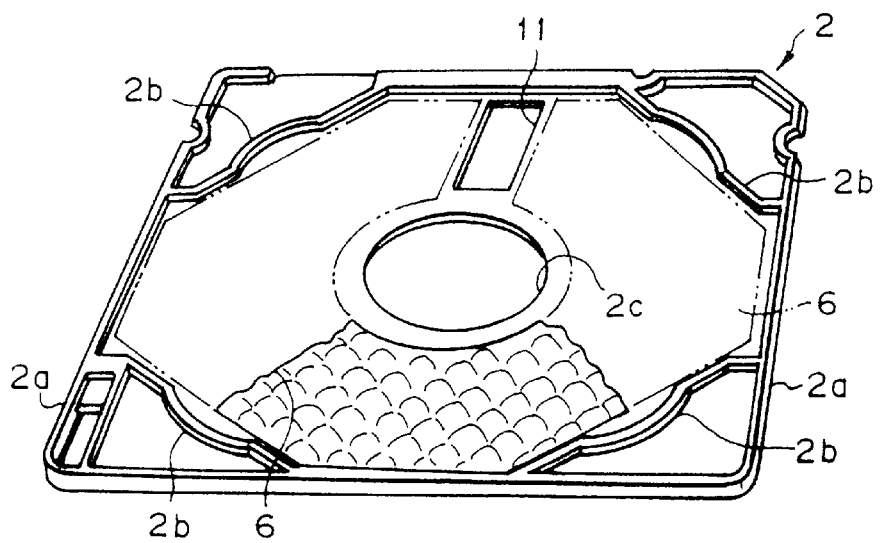
Figure 2:
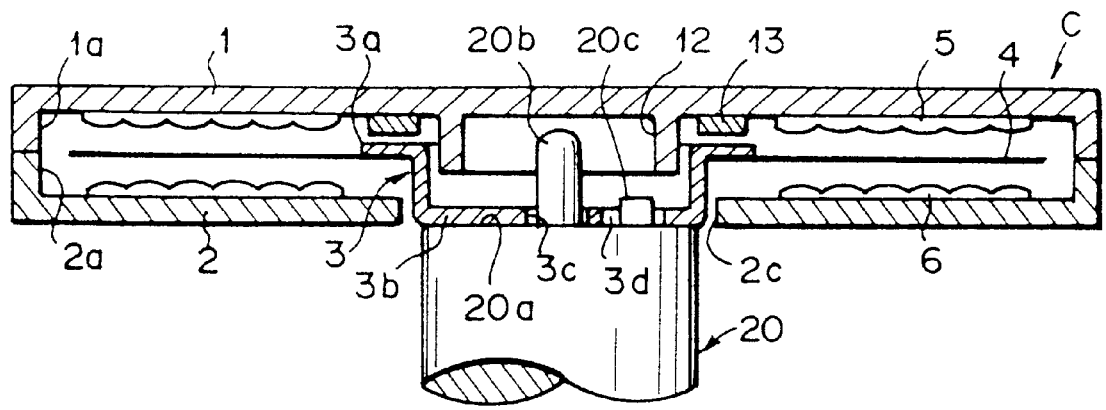
FIG. 2 is a schematic cross-sectional view of the magnetic disc cartridge and the spindle after chucking.
Figure 3:
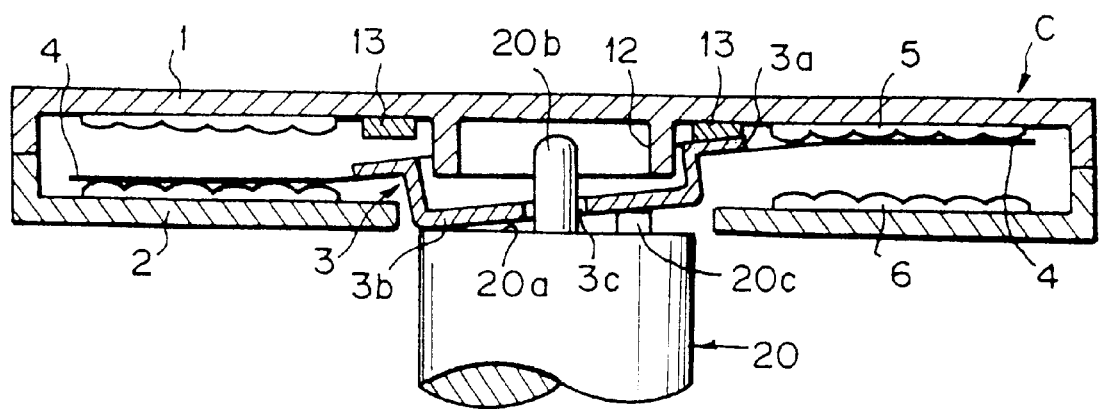
FIG. 3 is a schematic cross-sectional view of the magnetic disc cartridge and the spindle before chucking.

In FIGS. 1 to 3, where thicknesses and the like of elements are shown in ratios different from the practical values for the purpose of facilitating understanding, a magnetic disc cartridge in accordance with an embodiment of the present invention comprises a flat hard casing C which is formed of upper and lower shell halves 1 and 2. The shell halves 1 and 2 are formed of synthetic resin such as acrylonitrile-butadiene-styrene copolymer and mated together. A magnetic disc 4 provided with a center core 3 fixed to its center is contained in the casing C to be rotatable therein. Upper and lower cleaning members 5 and 6 are disposed on the inner surfaces of the upper and lower shell halves 1 and 2, respectively. The magnetic disc 4 comprises magnetic layers formed on opposite sides of a flexible disc base of a polyester sheet or the like.

The center core 3 is provided with a collar portion 3a on which the magnetic disc 4 is fixed and an abutment surface 3b which is parallel to the collar portion 3a. The upper side of the abutment surface 3b inside the collar portion 3a is recessed. A center hole 3c is formed in the abutment surface 3b substantially at the center thereof and a drive pin hole 3d is formed in the abutment surface radially outwardly spaced from the center hole 3c.

As shown in FIG. 2, the abutment surface 3b is adapted to be held against a pedestal surface 20a on a spindle 20 of a disc drive system under magnetic attraction. A central projection 20b which is adapted to be received in the center hole 3c of the core 3 projects upward at the center of the pedestal surface 20a and a drive pin 20c which is adapted to be received in the drive pin hole 3d projects upward from the pedestal surface 20a in a position spaced radially outward from the central projection 20b.

The upper and lower shell halves 1 and 2 are flat and substantially square in shape. Outer peripheral ribs 1a and 2a extend along the outer peripheries of the respective halves 1 and 1 to form the side wall of the casing C. Inner ribs 1b and 2b extend obliquely at each corner of the respective halves 1 and 2. Further a magnetic head insertion openings 10 and 11 are formed in the upper and lower shell halves 1 and 2, respectively. A circular spindle hole 2c is formed in the lower shell half 2 at the center thereof. The abutment surface 3b of the center core 3 is exposed through the spindle hole 2c. Though not shown, a shutter member for opening and closing the magnetic head insertion openings 10 and 11 are mounted on the casing C to be slidable left and right as seen in FIG. 1.

The cleaning members 5 and 6 are, for instance, of nonwoven material and are substantially octagonal in shape though may be circular. The cleaning members 5 and 6 are bonded to the inner surfaces of the upper and lower shell halves 1 and 2, for instance, by supersonic welding. The inner ribs 1b and 2b are formed outside the cleaning members 5 and 6 along the contour of the cleaning members 5 and 6.

An annular protrusion 12 is formed on the inner surface of the upper shell half 1 at the center thereof so as to project toward the center core 3 inside the collar portion 3a. The annular protrusion 12 is received in the recess on the upper side of the abutment surface 3b to limit radial movement of the center core 3.

Further a contact member 13 is formed around the annular protrusion 12 to project from the inner surface of the upper shell half 1 toward the center core 3 in a position substantially opposed to the collar portion 3a. The contact member 13 is annular, is formed of an elastic material and is lower than the annular protrusion 12. The contact member 13 is spaced from the collar portion 3a of the center core 3 so that the contact member 13 is held away from the collar portion 3a when the abutment surface 3b is attracted against the pedestal surface 20a of the spindle 20 with the central projection 20b and the drive pin 20c respectively received in the center hole 3c and the drive pin hole 3d of the center core 3, where the center core 3 is rotated with the magnetic disc 4 held horizontally as shown in Figure. In this chucking state, the cleaning members 5 and 6 are also held away from the magnetic disc 4, whereby the resistance against rotation of the magnetic disc 4 is lightened.

On the other hand, in the state where the drive pin 20c is not received in the drive pin hole 3d but in abutment against the lower surface of the abutment surface 3b of the center core 3 with the central projection 20b received in the center hole 3c, the center core 3 is inclined to bring the collar portion 3a into contact with the contact member 13 as shown in FIG. 3.

When the spindle 20 is rotated in this state, friction between the contact member 13 and the collar portion 3a of the center core 3 resists against rotation of the center core 3 and keeps stationary the center core 3 or keeps the center core 3 to rotate at a speed lower than the spindle 20. Accordingly the drive pin 20c rotates relative to the center core 3 with the tip of the drive pin 20c slid on the abutment surface 3b of the center core 3 and when the drive pin 20c is brought to the drive pin hole 3d, the drive pin 20c falls into the drive pin hole 3d to be engaged with the drive pin hole 3d as shown in FIG. 2.

The contact member 13 may be formed of an elastic plastic material fixed to the inner surface of the shell half 1. The contact surface of the contact member is provided with a wear resistant layer to reduce wear of the contact surface.

The contact member 13 may be formed of a resilient material such as a spring leaf of metal, a wire spring of metal or the like, or may be formed integrally with the casing C.

The contact member 13 may be either a continuous annular member or a plurality of discontinuous protrusions arranged in a circle.

What is claimed is:

1. A magnetic disc cartridge comprising a large capacity magnetic disc which is provided with a center core fixed to its center and is contained for rotation in a casing which is provided with a magnetic head insertion opening through which a magnetic head of a disc drive system is inserted into the casing and a spindle hole through which a spindle of the disc drive system is inserted into the casing, wherein the center core is provided with a collar portion on which the magnetic disc is fixed and an abutment surface which is parallel to the collar portion and is adapted to be held against a pedestal surface on the spindle of the disc drive system under magnetic attraction, a center hole being formed in the abutment substantially at the center thereof, and a drive pin hole being formed in the abutment surface radially outwardly spaced from the center hole for receiving a drive pin on the spindle of the disc drive system to rotate the magnetic disc, an annular protrusion is formed on the inner surface of the casing opposed to the spindle hole so as to project toward the center core inside the collar portion to limit radial movement of the center core, and a contact member is formed around the annular protrusion to project from the inner surface of the casing opposed to the spindle hole toward the center core in a position substantially opposed to the collar portion, and where when the drive pin is received in the drive pin hole the contact member is held away from the collar portion as the center core is rotated with the magnetic disc held horizontally and wherein when the drive pin is not received in the drive pin hole the contact member is brought into contact with the collar portion to resist against rotation of the center core as the center core is rotated with the magnetic disc held inclined.

2. A magnetic disc cartridge as defined in claim 1 in which a wear resistant layer is provided on the contact surface of the contact member.

3. A magnetic disc cartridge as defined in claim 1 in which the contact member is formed of a material selected from the group consisting of a spring leaf of metal, a wire spring of metal and resilient plastic resin.

4. A magnetic disc cartridge as defined in claim 1 in which the contact member is an annular member which is formed of an elastic material and is lower than the annular protrusion.

5. A magnetic disc cartridge as defined in claim 1 in which a cleaning member is provided on the inner surface of the casing opposed to each side of the magnetic disc and the cleaning members on the inner surface of the casing are held away from the magnetic disc when the center core is rotated with the magnetic disc held horizontally so that the resistance against rotation of the magnetic disc is lightened.

* * * * *